United States Patent
Yamane

[19]
[11] Patent Number: 6,155,132
[45] Date of Patent: Dec. 5, 2000

[54] SHIFTING UNIT FOR A BICYCLE

[75] Inventor: Takuro Yamane, Sakai, Japan

[73] Assignee: Shimano Inc., Osaka, Japan

[21] Appl. No.: 09/238,439

[22] Filed: Jan. 28, 1999

[51] Int. Cl.$^7$ .................................................. F16C 1/12
[52] U.S. Cl. .......................................... 74/502.2; 74/489
[58] Field of Search .................................. 74/502.2, 488, 74/489

[56] References Cited

U.S. PATENT DOCUMENTS

| | | | |
|---|---|---|---|
| 5,012,692 | 5/1991 | Nagano | 74/502.2 |
| 5,094,120 | 3/1992 | Tagawa | 74/502.2 |
| 5,203,213 | 4/1993 | Nagano | 74/502.2 |
| 5,213,005 | 5/1993 | Nagano | 74/502.2 |
| 5,676,022 | 10/1997 | Ose | 74/502.2 |
| 5,730,030 | 3/1998 | Masui | 74/502.2 |
| 5,957,002 | 9/1999 | Ueng | 74/489 |

*Primary Examiner*—David A. Bucci
*Assistant Examiner*—Chong H. Kim
*Attorney, Agent, or Firm*—Shinjyu Global IP Counselors, LLP

[57] ABSTRACT

A shifting unit for a bicycle is basically provided with a mounting member, a first shifting lever, a first biasing member, a second shifting lever, a second biasing member and release mechanism. Many of the parts of the shifting unit are constructed by pressing a metal sheet material. The first shifting lever is pivotally coupled to the mounting member between at least first, second and third shift positions, with the second shift position being located between the first and third shift positions. The first biasing member applies a biasing force that urges the first shifting lever from the second and third shift positions towards the first shift position. The second shifting lever is pivotally coupled to the mounting member between a set position and a release position. The second biasing member applies a biasing force that urges the second shifting lever from the release position to the set position. The release mechanism is operatively coupled between the first and second shifting levers to hold the first shifting lever in one of the first, second and third shift positions against the first biasing force of the first biasing member. The release mechanism is moved to selectively release one of the second and third locking portions from the first shifting lever upon rotation of the second shifting lever from the set position to the release position such that the first shifting lever moves one only position.

18 Claims, 10 Drawing Sheets

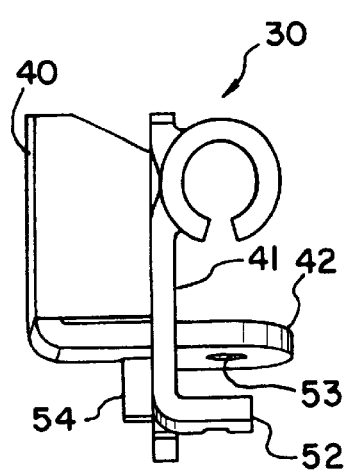
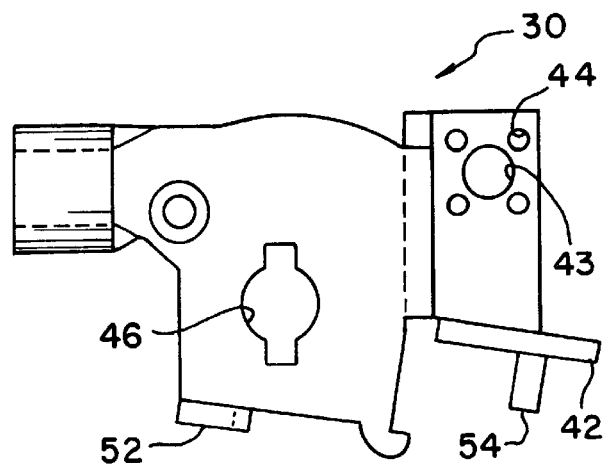
FIG. 21   FIG. 22
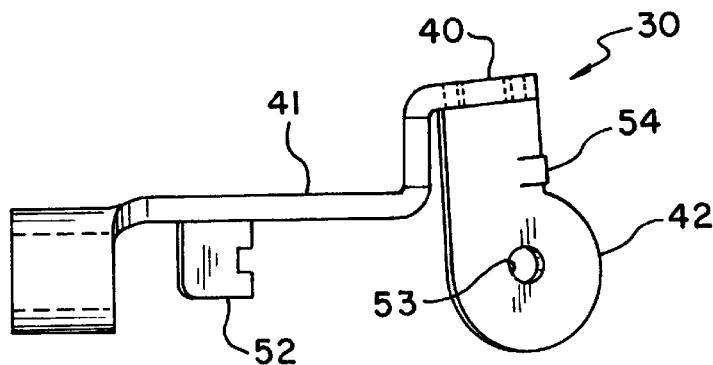
FIG. 23
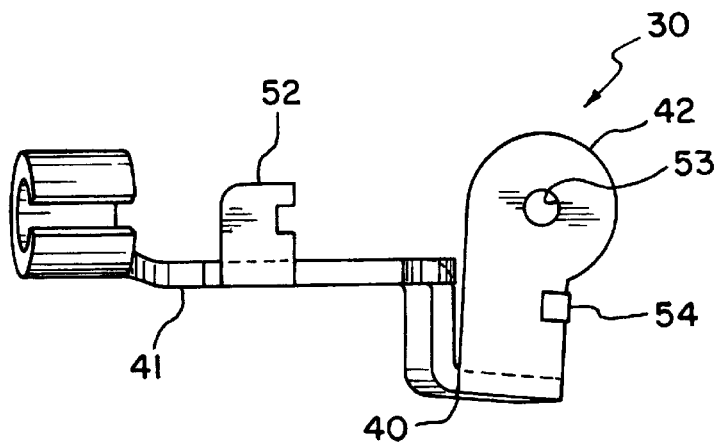
FIG. 24

SHIFTING UNIT FOR A BICYCLE

BACKGROUND OF THE INVENTION

1. Field of the Invention

This invention generally relates to a shifting unit for a bicycle. More specifically, the present invention relates a shifting unit for a bicycle that includes at least three shifting stages.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter and less expensive while maintaining a high level of performance. One particular component of the bicycle, which has been extensively redesigned over the past years, is the shifting units of bicycles.

There are many different types of shifting units that are currently available on the market. The shifting units range in quality and in price. Typically, the inexpensive shifting units have low quality. For example, it is very difficult to control the shifting of the gears one stage at a time. These low quality shifting units tend to be difficult to ship one stage at a time. In the more expensive and higher quality shifting units, the shifting unit is capable of being shifted one stage at a time.

However, these higher quality shifting units utilize complicated and expensive parts which results in their high cost the rider. Accordingly, the prior art devices that can shift one stage at a time tend to be expensive and/or complicated.

In view of the above, there exists a need for a shifting unit for a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a shifting unit for a bicycle that has at least three shift stages and shifts one stage at a time.

Another object of the present invention is to provide a shifting unit for a bicycle that is relatively inexpensive to manufacture.

Another object of the present invention is to provide a shifting unit for a bicycle that utilizes mostly pressed metal parts.

Still another object of the present invention is to provide a shifting unit for a bicycle that is relatively lightweight.

The foregoing objects can basically be attained by providing a shifting unit for a bicycle, comprising a mounting member, a first shifting lever, a first biasing member, a second shifting lever, a second biasing member and release mechanism.

The mounting member is adapted to be coupled to a portion of the bicycle. The first shifting lever is pivotally coupled to the mounting member between at least a first shift position, a second shift position and a third shift position, with the second shift position being located between the first and third shift positions. The first biasing member is coupled to the first shifting lever to apply a first biasing force that urges the first shifting lever from the second and third shift positions towards the first shift position. The second shifting lever is pivotally coupled to the mounting member between a set position and a release position. The second biasing member is coupled to the second shifting lever to apply a second biasing force that urges the second shifting lever from the release position to the set position. The release mechanism is operatively coupled between the first and second shifting levers. The release mechanism includes a locking portion that selectively engages the first shifting lever to hold the first shifting lever in one of the first, second and third shift positions against the first biasing force of the first biasing member. A portion of the release mechanism is moved to selectively release the locking portion from the first shifting lever upon rotation of the second shifting lever from the set position to the release position such that the first shifting lever moves only one position.

The foregoing objects can further be attained by providing a shifting unit for a bicycle, comprising a mounting member, a first shifting lever, a first biasing member, a positioning plate, a second biasing member, a second shifting lever and a third biasing member. The mounting member is adapted to be coupled to a portion of the bicycle. The first shifting lever is pivotally coupled to the mounting member between at least a first shift position, a second shift position and a third shift position, with the second shift position being located between the first and third shift positions. The first biasing member is coupled to the first shifting lever to apply a first biasing force that urges the first shifting lever from the second and third shift positions towards the first shift position. The positioning plate is pivotally coupled to the mounting member to hold the first shifting lever in one of the first, second and third shift positions. The second shifting lever is pivotally coupled to the mounting member between a set position and a release position. The second biasing member is coupled to the second shifting lever to apply a second biasing force that urges the second shifting lever from the release position to the set position. The positioning plate includes a first abutment member and a second abutment member. The third biasing member is coupled to the positioning plate to apply a third biasing force that urges the positioning plate against the first shifting lever. The second shifting lever includes a third abutment member and a fourth abutment member. The third abutment member is positioned to engage the first abutment member upon rotation of the second shifting lever from the set position to the release position when the first shifting lever is in the third shift position. This allows the positioning plate to rotate against the third biasing force of the third biasing member to release the first shifting lever from the third shift position to the second shift position. The fourth abutment member is positioned to engage the second abutment member upon rotation of the second shifting lever from the set position to the release position when the first shifting lever is in the second shift position. This allows the positioning plate to rotate against the third biasing force of the third biasing member to release the first shifting lever from the second shift position to the first shift position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 21 is an end elevational view of the bracket for the shifting unit illustrated in FIGS. 2–19;

FIG. 22 is a side elevational view of the bracket illustrated in FIG. 21 for the shifting unit illustrated in FIGS. 2–19;

FIG. 23 is a top plan view of the bracket illustrated in FIGS. 21 and 22 for the shifting unit illustrated in FIGS. 2–19;

FIG. 24 is a bottom plan view of the bracket illustrated in FIGS. 21–23 for the shifting unit illustrated in FIGS. 2–19;

DETAILED DESCRIPTION OF THE PREFERRED EMBODIMENTS

Figure 1:
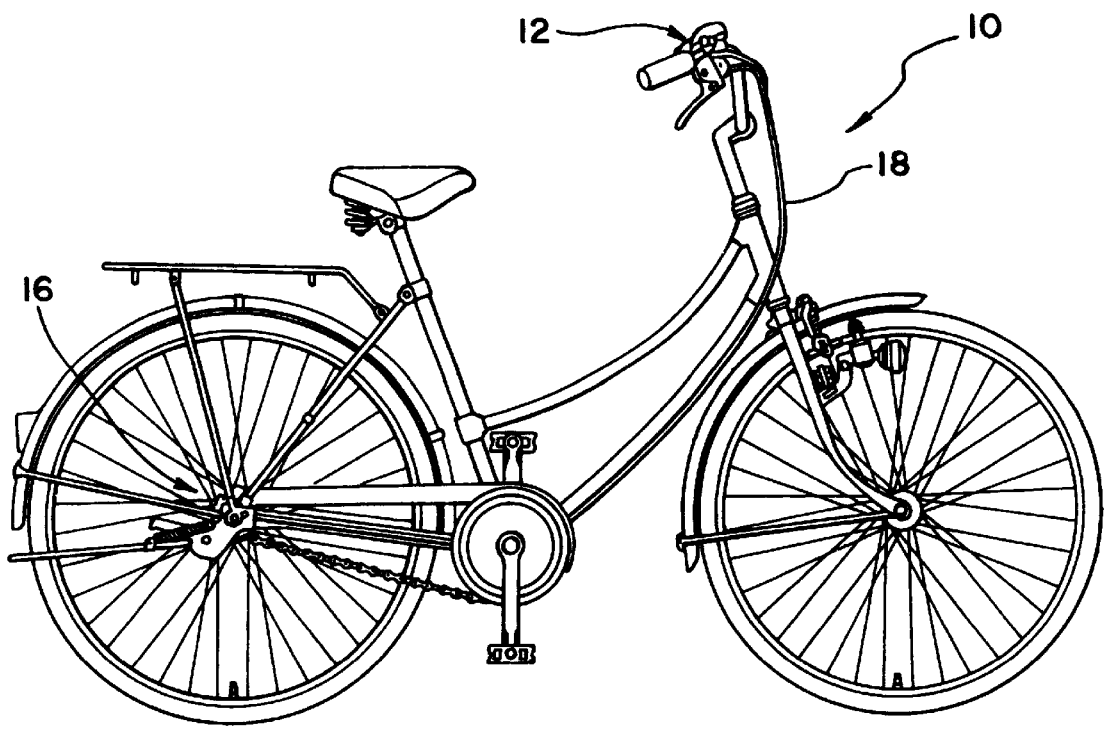
FIG. 1 is a partial side elevational view of a conventional bicycle with a shifting unit coupled thereto in accordance with one embodiment of the present invention.
Figure 2:
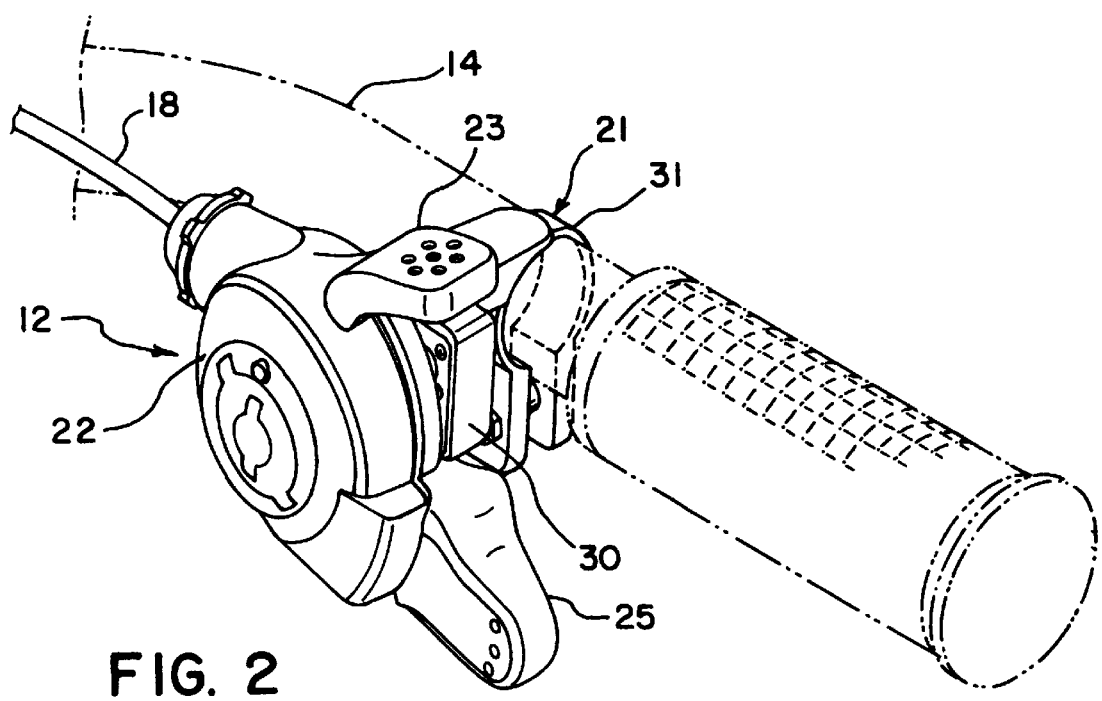
FIG. 2 is a perspective view of the shifting unit coupled to handlebar of the bicycle in accordance with one embodiment of the present invention.

Referring initially to FIGS. 1 and 2, a conventional bicycle 10 is illustrated having a shifting unit 12 coupled to handlebar 14 of the bicycle 10 in accordance with one embodiment of the present invention. Bicycles and their various components are well known in the prior art, and thus, bicycle 10 and its various components will not be discussed or illustrated in detail herein, except for the components that relate to the present invention. In other words, only shifting unit 12 and the components that relate thereto will be discussed and/or illustrated herein.

Shifting unit 12 is operatively coupled to an internally geared hub 16 via transmission element or cable 18 to change gears in the hub 16. While shifting unit 12 is illustrated as a three stage shifting unit, it will be apparent to those skilled in the art from this disclosure that shifting unit 12 can be constructed with additional stages, e.g., a four stage shifting unit, Thus, shifting unit 12 of the present invention is constructed to shift up or down one stage at a time.

Figure 3:
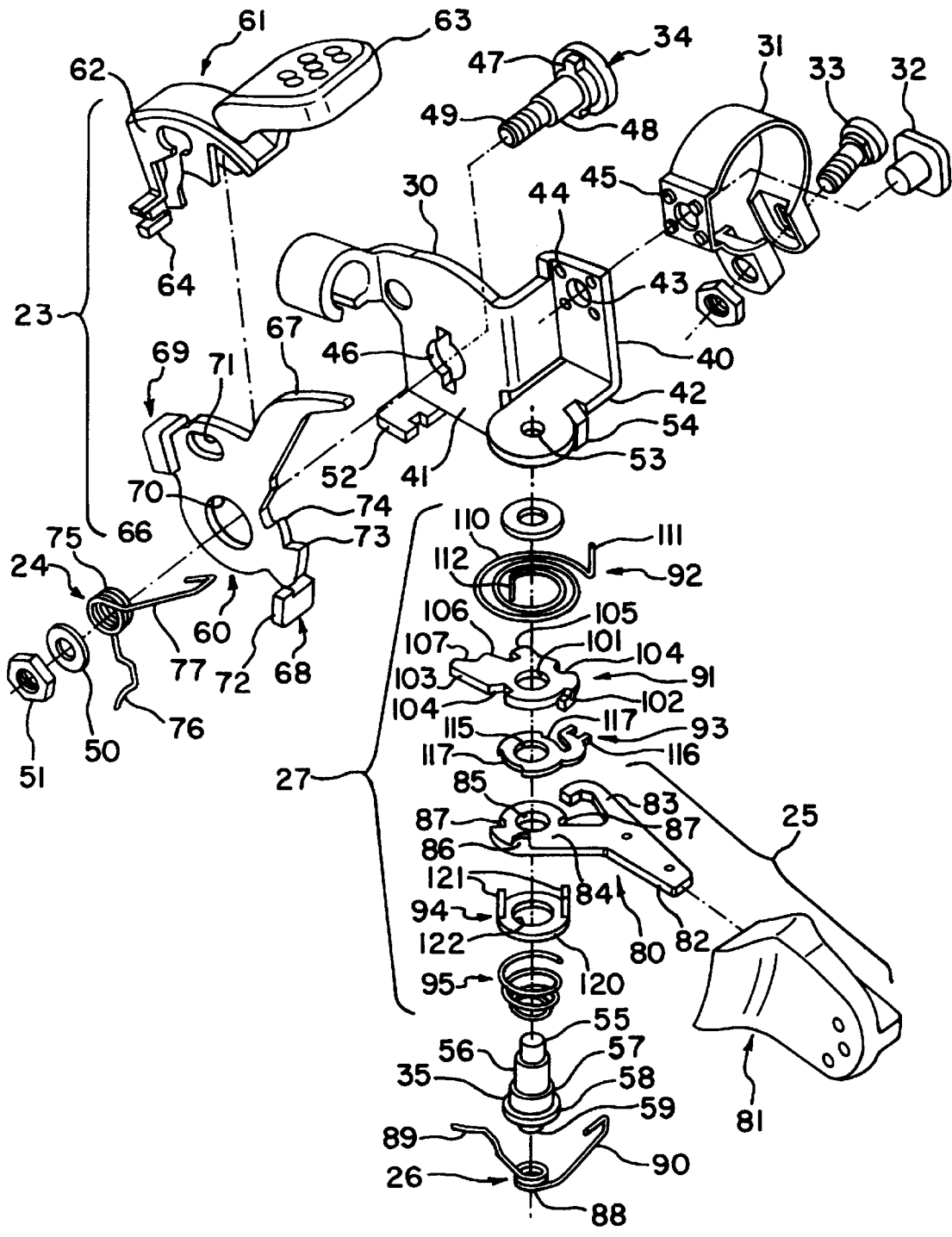
FIG. 3 is an exploded perspective view of selected parts of the shifting unit illustrated in FIG. 2 in accordance with one embodiment of the present invention.

Referring now to FIGS. 2 and 3, shifting unit 12 basically includes a mounting member 21, a housing 22, a first shifting lever 23, a first biasing member 24, a second shifting lever 25, a second biasing member 26 and release mechanism 27. Mounting member 21 is adapted to be coupled to a portion of bicycle 10 such as handlebar 14. Mounting member 21 is preferably constructed of several parts. In particular, mounting member 21 includes a bracket 30, a band clamp 31, band axle 32 and band fastener 33. Preferably, these parts of mounting member 21 are constructed of a metal material such as steel. For example, bracket 30 and band clamp 31 are constructed by pressing and cutting a metal sheet. Bracket 30 is fixedly coupled to band clamp 31 by riveting band axle 32 therebetween.

As seen in FIG. 2, housing 22 covers release mechanism 27 as well as portions of first shifting lever 23, first biasing member 24, second shifting lever 25, second biasing member 26 and bracket 30. Housing 22 can be either a plastic member or a metal that is fixedly coupled to bracket 30 in any conventional manner, e.g., by a snap-fit, fasteners, etc. The construction of housings 22 is not pertinent to the present invention, and thus, housings 22 will not be discussed in further detail herein.

Figure 5:
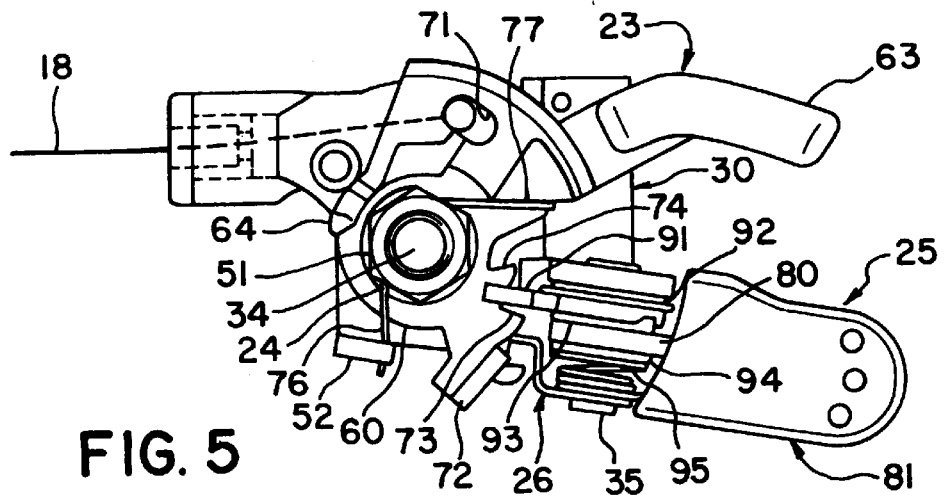
FIG. 5 is a partial side elevational view of selected parts of the shifting unit illustrated in FIGS. 2–4, with the first shifting lever in its second or intermediate shift position and the second shifting lever in its set position.
Figure 6:
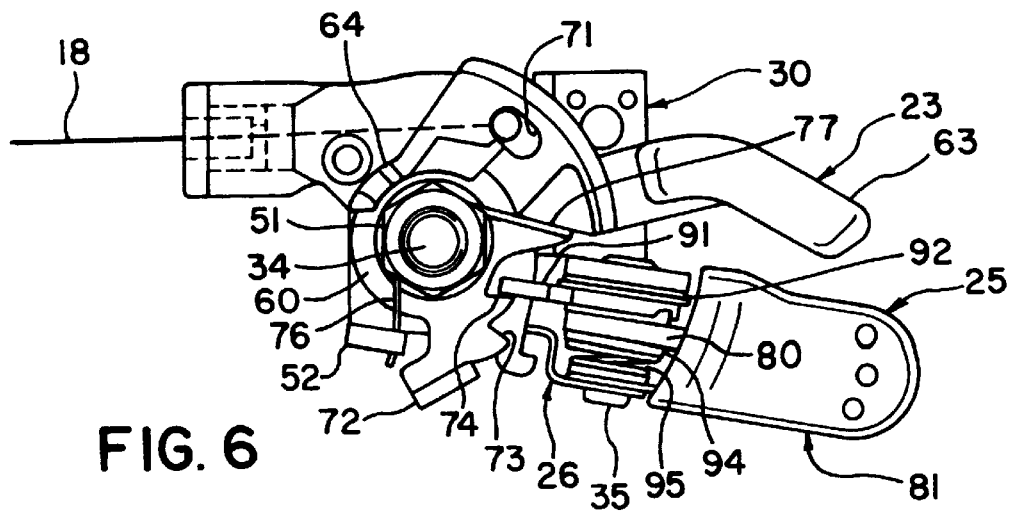
FIG. 6 is a partial side elevational view of selected parts of the shifting unit illustrated in FIGS. 2–5, with the first shifting lever in its third shift position and the second shifting lever in its set position.
Figure 7:
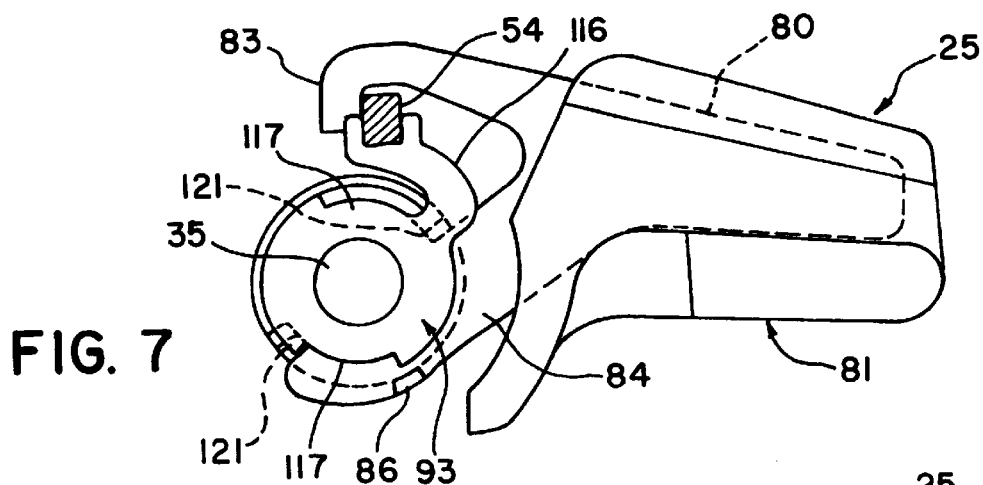
FIG. 7 is a partial top plan view of selected parts of the second shifting lever for the shifting unit illustrated in FIGS. 2–6, with the second shifting lever in its set position.
Figure 8:
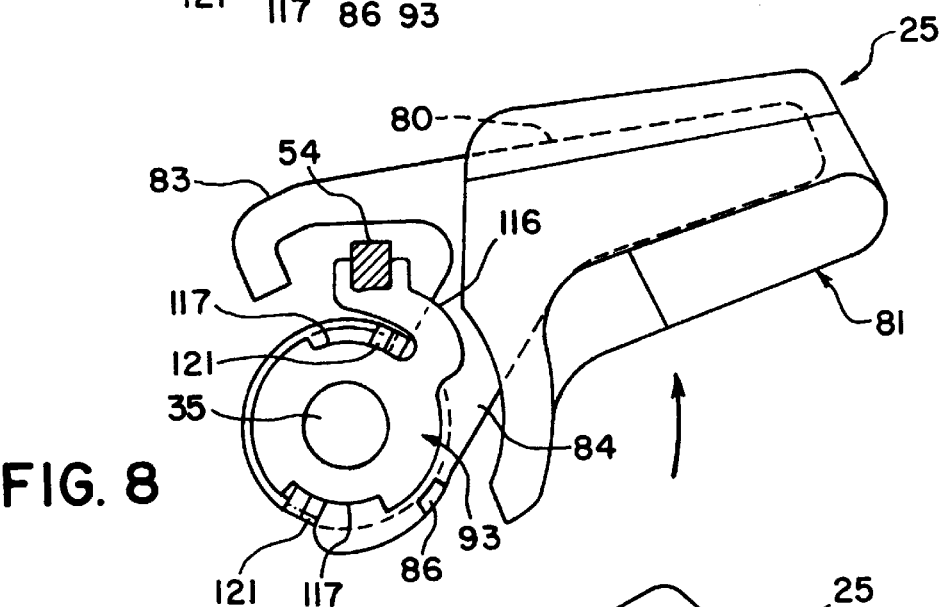
FIG. 8 is a partial top plan view of selected parts of the second shifting lever for the shifting unit illustrated in FIGS. 2–7, with the second shifting lever partially pushed from its set position to its release position.
Figure 9:
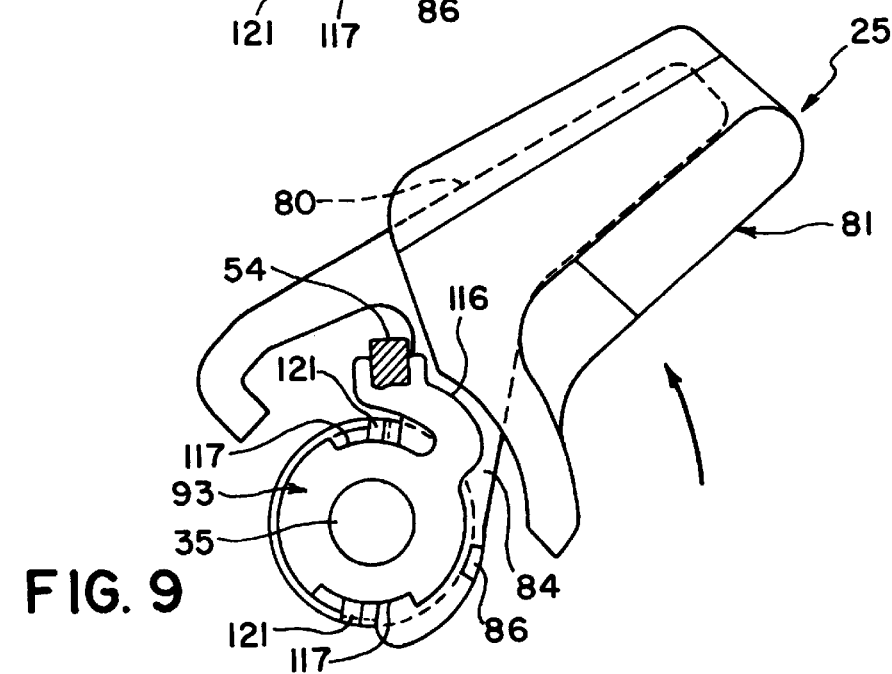
FIG. 9 is a partial top plan view of selected parts of the second shifting lever for the shifting unit illustrated in FIGS. 2–8, with the second shifting lever fully depressed to its release position.

First shifting lever 23 is pivotally coupled to bracket 30 of mounting member 21 by a first axle member 34 between at least a first shift position (FIG. 4), a second shift position (FIG. 5) and a third shift position (FIG. 6). The second shift position is located between the first and third shift positions. Thus, first shifting lever 23 has three shifting stages. Of course, it will become apparent to those skilled in the art from this disclosure that shifting unit 12 can be constructed with four or more shift positions.

First biasing member 24 is coupled between first shifting lever 23 and bracket 30 to apply a first biasing force that urges first shifting lever 23 from the second and third shift positions towards the first shift position. First shifting lever 23 can be moved against the force of first biasing member 24 to shift from the first shift position to the second shift position, or the third shift position without stopping in the second shift position.

Second shifting lever 25 is pivotally coupled to bracket 30 of mounting member 21 by a second axle member 35 for movement between a set position and a release position. The movements of second shifting lever 25 between its set and release positions are illustrated in FIGS. 7-16. Second biasing member 26 is coupled between second shifting lever 25 and bracket 30 to apply a second biasing force that urges second shifting lever 25 from the release position to the set position. Unlike first shifting lever 23, second shifting lever 25 can only move one stage at a time. In particular, when second shifting lever 25 is pushed from its set position to its release position, the release mechanism 27 releases first shifting lever 23 one shifting stage at a time as explained below.

Release mechanism 27 is operatively coupled between first and second shifting levers 23 and 25 as illustrated in FIGS. 4-20. Release mechanism 27 locks first shifting lever 23 in each of its three shift positions (FIGS. 4–6) as well as releases first shifting lever 23 one shifting stage at a time in response to movement of second shifting lever 25 (FIGS. 7–20). As explained below in more detail, release mechanism 27 includes a locking portion that selectively engages first shifting lever 23 to hold first shifting lever 23 in one of the three shift positions against the first biasing force of first biasing member 24. A portion of release mechanism 27 is selectively moved away from the locking portion of first shifting lever 23 upon rotation of second shifting lever 25 from the set position to the release position such that first shifting lever 23 moves only one position.

Referring to FIGS. 3 and 21–24, bracket 30 pivotally supports both first shifting lever 23 and second shifting lever 25 thereon. Preferably, bracket 30 is constructed as one-piece, unitary member by pressing a metal sheet material. Specifically, bracket 30 basically includes a band mounting portion 40, a first lever mounting portion 41 coupled to band mounting portion 40 by a connecting portion and a second lever mounting portion 42 coupled to band mounting portion 40 by a fold line. Band mounting portion 40 has a large hole 43 for fixedly receiving the end of band axle 32 therein, and four smaller holes 44 for receiving posts 45 of band clamp 31 to prevent relative rotation between bracket 30 and band clamp 31.

First lever mounting portion 41 has an axle hole 46 formed in its center for receiving a first axle member 34 therein. Axle hole 46 has a noncircular shape that corresponds to a portion of first axle member 34 such that first axle member 34 is nonrotatably coupled to a first lever mounting portion 41 of bracket 30.

First axle member 34 has a step shaped shaft with a noncircular shaped portion 47, a cylindrical portion 48 and a threaded free end 49. The noncircular shaped portion 47 of first axle member 34 engages axle hole 46 to prevent relative rotational movement of first axle member 34 within axle hole 46. The cylindrical portion 48 rotatably supports first shifting lever 23 thereon. The first biasing member 24 is also supported on cylindrical portion 48 of first axle member 34. The threaded free end 49 of first axle member 34 receives a washer 50 and a lock nut 51 thereon. Accordingly, first axle member 34 pivotally supports first shifting lever 23 on bracket 30.

Figure 4:
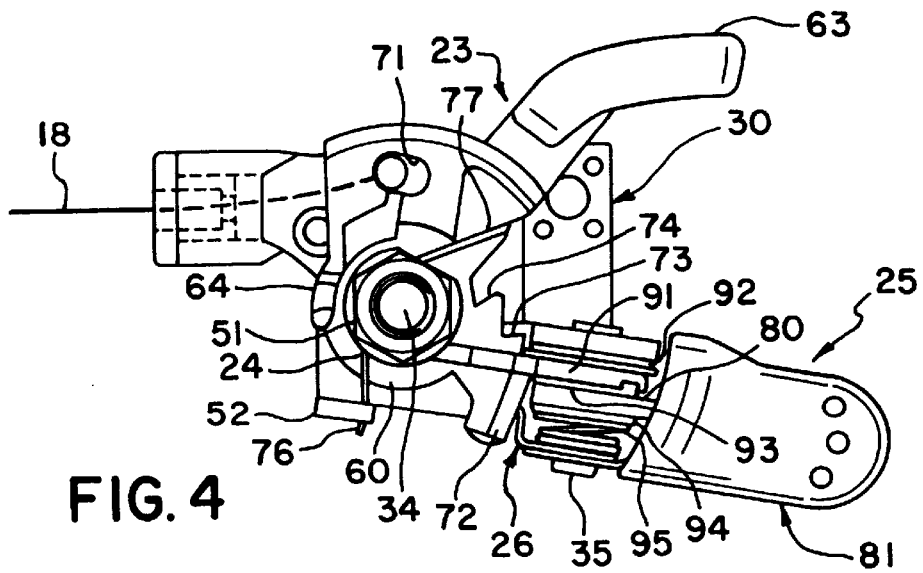
FIG. 4 is a partial side elevational view of selected parts of the shifting unit illustrated in FIGS. 2 and 3, with the first shifting lever in its first shift position and the second shifting lever in its set position.

A stop flange 52 extends outwardly from bracket 30 for engaging one end of first biasing member 24. The other end of first biasing member 24 engages first shifting lever 23. Accordingly, first shifting lever 23 is biased in a counter clockwise direction as seen in FIGS. 4–6.

Second lever mounting portion 42 of bracket 30 extends outwardly from band mounting portion 40. Second lever mounting portion 42 has a stop flange 54 extending downwardly therefrom for engaging portions of the second shifting lever 25 and release mechanism 27 for controlling their pivotal movements, as explained below in more detail.

An axle hole 53 is also formed in the second lever mounting portion 42 for receiving a portion of second axle 35 therein. Preferably, second axle 35 is fixedly coupled to second lever mounting portion 42 by a riveting process. More specifically, second axle 35 is a step-shaped axle having 5 cylindrical portions 55-59. The cylindrical portion 55 at the free end of second axle 35 is received in axle hole 53 and then deformed so as to rivet second axle 35 to second lever mounting portion 42. Thus, second axle 35 pivotally secures second shifting lever 25 and release mechanism 27 to bracket 30.

Figures 25, 26:
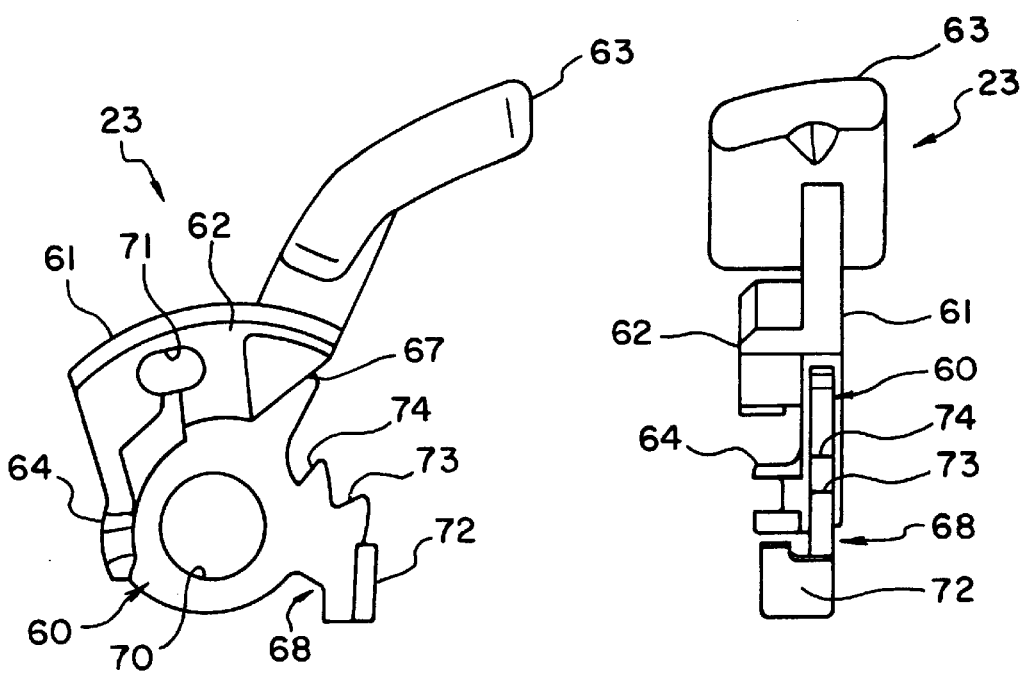
FIG. 25 is a side elevational view of the first shifting lever for the shifting, unit illustrated in FIGS. 2–19.
FIG. 26 is an end elevational view of the first shifting lever illustrated in FIG. 25 for the shifting unit illustrated in FIGS. 2–19.

Referring to FIGS. 3, 25 and 26, first shifting lever 23 is preferably a twopart construction, with a first lever portion 60 and a first cover portion 61 that overlies part of first lever portion 60. First lever portion 60 is preferably constructed by pressing a metal sheet material, while first cover portion 61 is preferably formed by molding a plastic material. First cover portion 61 preferably includes a main body 62, a handle 63 and an indicator tab 64. Main body 62 and handle 63 have a recess for receiving first lever portion 60 therein. Indicator 64 is designed to cooperate with housing 22 in a conventional manner so that the rider can determine the shift position of the first shifting lever 23. For example, housing 22 can be provided with indicia such as "1", "2" and "3" for indicating the three shift positions of first shifting lever 23.

First lever portion 60 has a main body 66 with a handle 67 extending outwardly from the main body 66, a locking section 68 extending outwardly from main body 66 and a cable guide 69 extending in an axial direction from main body 66.

Main body 66 has an axle hole 70 for receiving first axle 34 therein. Specifically, main body portion 66 is pivotally located on the cylindrical portion 48 of first axle 34 so that first shifting lever 23 can pivot between its first, second and third shift positions.

The main body 66 of first lever portion 60 also has another opening 71 spaced from the axis of axial hole 70. Opening 71 is designed to receive the end of cable 18 for securing cable 18 thereto. Specifically, the end of cable 18 is secured within opening 71 by first cover portion 61. When first shifting lever 23 is pivoted about first axle 34, cable 18 is pulled in a substantially linear direction. In other words, cable 18 is not wound about first axle 34 when first shifting lever 23 is moved from its first shift position to its second shift position or its third shift position.

Locking section 68 of first lever portion 60 has a step-shaped configuration with a first stopper 72 bent out of the plane of the main body 66 so as to extend substantially perpendicularly from main body 66. First stopper 72 forms a first recess that is adapted to engage release mechanism 27 when first shifting lever 23 is in its first position as seen in FIG. 4. The cooperation between first stopper 72 and release mechanism 27 will be explained below in more detail.

Locking section 68 also has a second stopper 73 formed by a second recess and a third stopper 74 formed by a third recess. Second stopper 73 is located closer to the axis of first axle 34, then first stopper 72, such that second stopper 73 engages release mechanism 27 when first shifting lever 23 is in its second shift position as seen in FIG. 5. The third stopper 74 is located even closer to the axis of first axle 34, then either the first stopper 72 or the second stopper 73. Third stopper 74 is designed to engage release mechanism 27 when first shifting lever 23 is in its third shift position as seen in FIG. 6. The cooperation between release mechanism 27 and second and third stoppers 73 and 74 will be explained below in more detail.

Referring to FIGS. 3–6, first biasing member 24 is preferably a torsion spring constructed of wire. First biasing member 24 has a coil portion 75 with first and second ends 76 and 77 extending outwardly from coil portion 75. Coil portion 75 is designed to be supported on the cylindrical portion 48 of first axle 34. First end 76 of first biasing member 24 engages stop flange 52 of first lever mounting portion 41 of bracket 30, while second end 77 of first biasing member 24 engages handle 67 of first lever portion 60. Accordingly, first shifting lever 23 is biased in a counter-clockwise direction about first axle 34 as seen in FIGS. 4–6. In other words, first biasing member 24 applies a biasing force that urges first shifting lever 23 from either its second or third shift positions to its first shift position.

Figure 27:
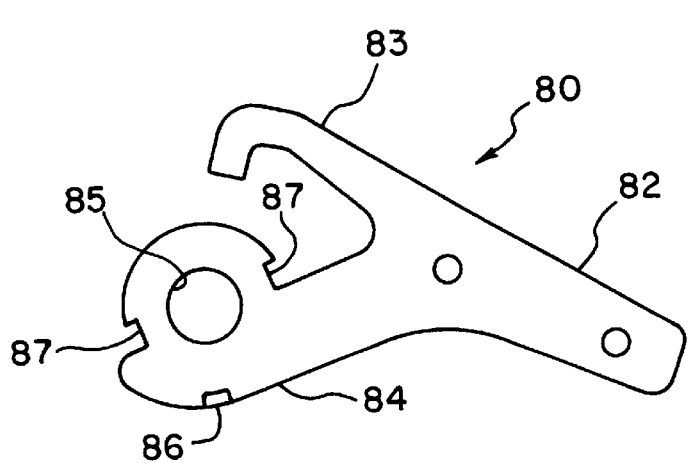
FIG. 27 is a top plan view of the second shifting lever for the shifting unit illustrated in FIGS. 2–19, with the handle removed.
Figure 28:
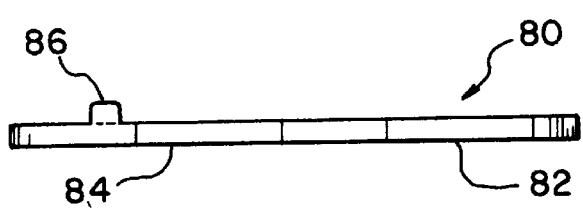
FIG. 28 is a side elevational view of the second shifting lever illustrated in FIG. 27 for the shifting unit illustrated in FIGS. 2–19, with the handle removed.
Figure 29:
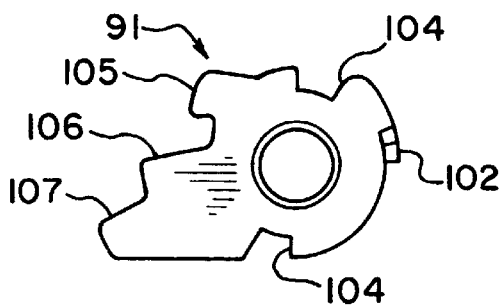
FIG. 29 is a top plan view of the positioning plate for the release mechanism of the shifting unit illustrated in FIGS. 2–19.
Figure 30:
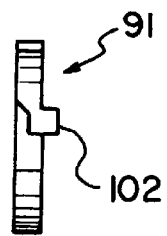
FIG. 30 is a right side elevational view of the positioning plate for the release mechanism of the shifting unit illustrated in FIGS. 2–19.
Figure 31:
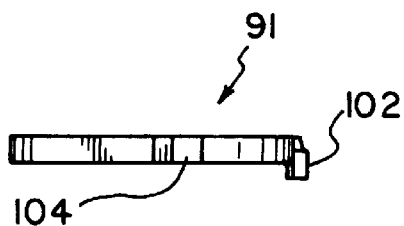
FIG. 31 is a front side elevational view of the positioning plate illustrated in FIG. 30 of the release mechanism for the shifting unit illustrated in FIGS. 2–19.

Referring to FIGS. 3, 27 and 28, second shifting lever 25 is basically a two-piece instruction with a second lever portion 80 and a second cover portion 81.

Second lever portion 80 is preferably formed by pressing a metal sheet material, while second cover portion 81 is preferably formed by molding a plastic material to form a handle for second shifting lever 25. Second cover portion 81 preferably has a slot that is designed to receive second lever portion 80 therein. In other words, second cover portion 81 overlies a portion of second lever portion 80. Second lever portion 80 has a handle 82, a hook-shaped stop flange 83 and a pivot flange 84. Pivot flange 84 has an axle hole 85 for receiving second axle 35 therein, an abutment 86 extending outwardly from pivot flange 84 in an axial direction, and a pair of notches 87 for fixedly securing a portion of release mechanism 27 thereto. Accordingly, second shifting lever 25 is pivotally supported on cylindrical portion 56 of second axle 35 for movement between its set position and its release position.

As seen in FIGS. 7–16 and as discussed below, stop flange 83 is designed to engage stop flange or stopper 54 of second lever mounting portion 42 of bracket 30 for limiting the pivotal movement of second shifting lever 25 due to the force applied thereto by second biasing member 26.

Abutment 86 is designed to engage a portion of release mechanism 27 to cause release mechanism 27 to release first shifting lever 23 so that it can move from its third shift position as seen in FIG. 6 to its second shift position as seen in FIG. 5.

Referring to FIG. 3, second biasing member 26 is preferably a torsion spring constructed of wire. Second biasing member 26 has a coil portion 88, a first end 89 and a second end 90. Coil portion 88 is supported on cylindrical portion 59 of second axle 35. First end 89 of second biasing member 26 engages a side surface of first lever mounting portion 41 of bracket 30, while the second end of second biasing member 26 is hooked about the handle 82 of second shifting lever 25. Accordingly, second shifting lever 25 is biased in a clockwise direction relative to bracket 30 as viewed downwardly along second axle 35 and as seen in FIGS. 7-16. In other words, second biasing member 26 urges second shifting lever 25 towards its set or rest position. Movement of second shifting lever 25 against the force of second biasing member 26 causes the release mechanism 27 to release first shifting lever 23 one stage when first shifting lever is in either its second or third shift position.

Referring to FIGS. 3, and 7-20, release mechanism 27 is operatively coupled between first shifting lever 23 and second shifting lever 25 such that when second shifting lever 25 is moved from its set position to its release position, release mechanism 27 allows first shifting lever 26 to move one shift stage under the force of first biasing member 24. Also, release mechanism 27 is designed to overridably lock first shifting lever 23 in its first, second and third shift positions. Release mechanism 27 basically includes a positioning plate 91, a third biasing member or return spring 92, a pawl control plate 93, a pawl plate 94 and a fourth biasing member or spring 95. Release mechanism 27 is mounted on second lever mounting portion 42 of bracket 30 via second axle 35.

Referring to FIGS. 3, and 29–31, positioning plate 91 has an axle hole 101, an abutment 102, a locking portion 103 and a pair of notches 104. Axle hole 101 receives second axle 35 therethrough such that positioning plate 91 pivots on cylindrical portion 56 of second axle 35. Abutment 102 of positioning plate 91 is designed to selectively engage abutment 86 of second lever portion 80 when second shifting lever 25 is moved from its set position to its release position, and first shifting lever 25 is in its third shift position. In other words, abutment 102 of positioning plate 91 engages abutment 86 of second lever portion 80 to move first shifting lever 23 from its third shift position to its second shift position. This shifting process will be explained in more detail below.

Locking portion 103 has three stop ends 105, 106 and 107. These stop ends 105, 106 and 107 are designed to engage either first lever portion 60 or bracket 30 to limit the rotational movement of positioning plate 91 due to the force of third biasing member 92. First stop end is located closer to the axis of second axle 35 than second stop end 106 or third stop end 107. Second stop end 106 is located closer to the axis of second axle 35 than third stop end 107. Accordingly, stop ends 105, 106, 107 form a somewhat step-shaped flange relative to the axis of rotation of positioning plate 91.

Notches 104 are spaced approximately 180° apart from each other and are designed to selectively engage pawl plate 94 to selectively move positioning plate 91.

More specifically, pawl plate 94 engages notches 104 to rotate positioning plate 91 when the first shifting lever 23 is in its second shift position, and second shifting lever is pivoted from its set position to its release position. Accordingly, notches 104 act as abutments for engaging abutments of pawl plate 94.

Referring to FIGS. 3, third biasing member 92 is preferably a torsion spring constructed of wire. The third biasing member has a coil portion 110, a first end 111 extending in a first axial direction from coil portion 110 and a second end 112 extending in a second axial direction from coil portion 110, which is opposite the first axial direction. Coil portion 110 fits around second axle 35, while first end 111 engages second lever mounting portion 42 of bracket 30, and second end 112 of third biasing member 92 engages a notch formed in positioning plate 91 which are located by second stop end 106. Third biasing member 92 is designed to bias positioning plate 91 in a clockwise direction as viewed looking down at second axle 35 of FIG. 3. Accordingly, positioning plate 91 is biased towards first shifting lever 23 and bracket 30. When second shifting lever 25 is pivoted from its set position to its release position, positioning plate 91 is biased against the force of third biasing member 92. This pivotal movement of positioning plate 91 by second shifting lever 25 against the biasing force of third biasing member 92 allows the first shifting lever 23 to move one stage.

Figure 32:
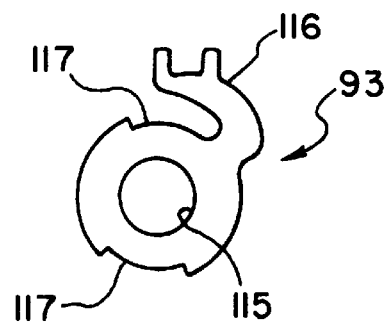
FIG. 32 is a top plan view of the pawl control plate for the release mechanism of the shifting unit illustrated in FIGS. 2–19.
Figure 33:
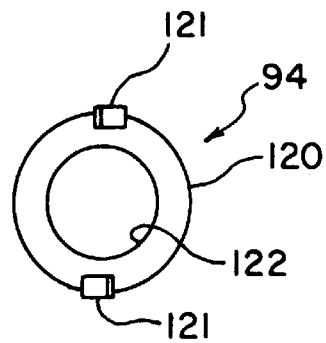
FIG. 33 is a top plan view of the pawl plate for the release mechanism of the shifting unit illustrated in FIGS. 2–19.
Figure 34:
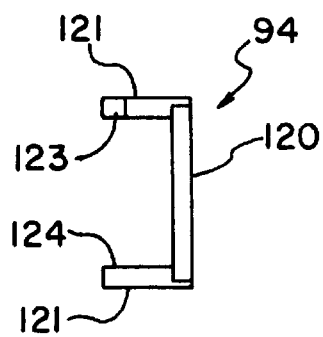
FIG. 34 is a right side elevational view of the pawl plate illustrated in FIGS. 34 for the release mechanism of the shifting unit illustrated in FIGS. 2–19.
Figure 35:
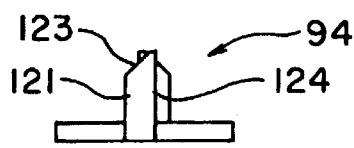
FIG. 35 is another side elevational view of the pawl plate illustrated in FIGS. 34 and 35.

Referring to FIGS. 3 and 32, pawl control plate 93 is non-rotatably mounted on second axle 35. Specifically, pawl control plate 93 has an axle hole 115, a stop arm 116 and a pair of elongated notches 117. Axle hole 115 is sized to be received on cylindrical portion 56 of axle 35. Stop arm 116 engages stop flange 54 of second lever mounting portion 42 of bracket 30 such that pawl control plate 93 cannot rotate relative to bracket 30. Alternatively, stop arm 116 can be eliminated and axle hole 115 can be splined with second axle 35 to prevent any relative rotational movement therebetween. The elongated notches 117 are designed to limit the amount of axial movement of pawl plate 94. In other words, pawl plate 94 engages notches 104 of positioning plate 91 only when notches 117 align with notches 104 and pawl plate 94 is being moved by second shift lever 25.

As seen in FIGS. 3 and 33–35, pawl plate 94 has a circular plate portion 120 and a pair of abutment arms 121 extending in an axial direction from plate portion 120. Plate portion 120 has an axle hole 122 which is designed to be rotatably supported on cylindrical portion 57 of second axle 35. Abutment arms 121 are received in notches 87 of second lever portion 80 such that pawl plate 94 and second lever portion 80 are coupled together for rotational movement. However, pawl plate 94 can move axially relative to second lever portion 80 within notches 87. In an alternative construction, pawl plate 94 can be a pair of spring-shaped arms that are integrally formed with second lever portion 80 during the pressing and cutting of second lever portion 80.

The fourth biasing member 95 normally presses pawl plate 94 upwardly towards second lever portion 80. The free ends of abutment arms 121 are tapered so as to form a ratcheting surface 123 and an abutment surface 124. These abutment arms 121 are designed to selectively engage notches 104 of positioning plate 191 for moving positioning plate 91 when first shifting lever 23 is in its second shift position.

Referring to FIG. 3, fourth biasing member 95 is preferably a coil compression spring that is located on the shaft of second axle 35 for engaging pawl plate 94. Fourth biasing member 95 is designed to be compressed so that pawl plate 94 can move upwardly into and out of engagement of notches 104 of positioning plate 91.

Positioning plate 91, pawl control plate 93 and pawl plate 94 are all constructed by bending or pressing metal sheet materials. Thus, these parts are very easily manufactured at a relatively low cost.

Figure 16:
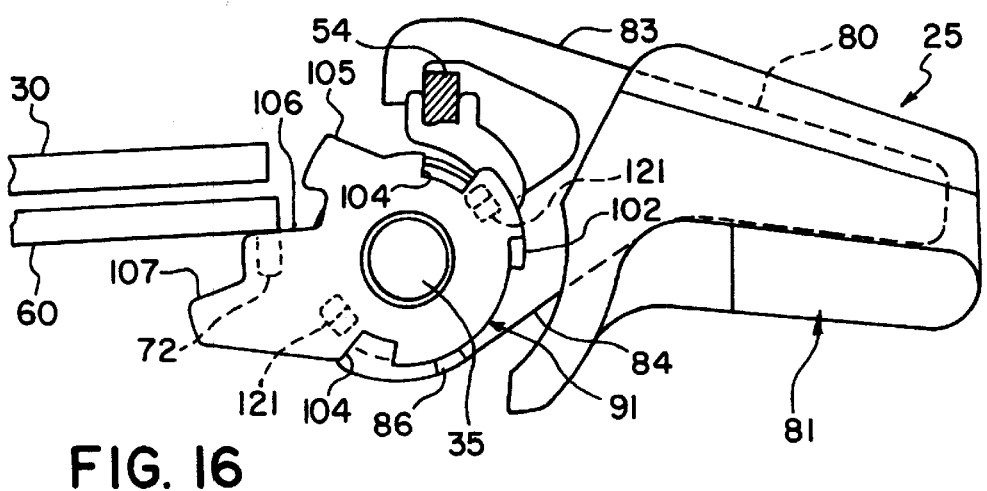
FIG. 16 is a partial top plan view of selected parts of the shifting unit illustrated in FIGS. 2–15, with the first shifting lever in its first shift position and the second shifting lever in its set position.
Figures 17, 18:
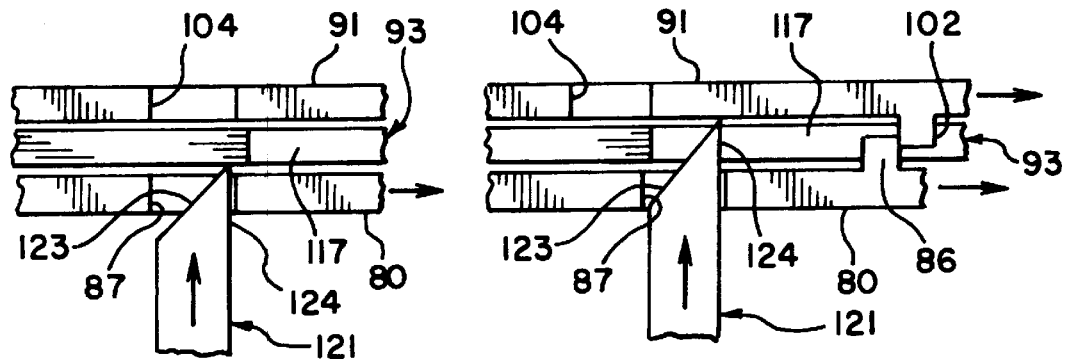
FIG. 17 is a partial side diagrammatic view of selected parts of the release mechanism and the second shifting lever with the shifting unit in the third shift position.
FIG. 18 is a partial side diagrammatic view of selected parts of the release mechanism and the second shifting lever as the second shifting lever is partially moved from the set position to the release position such that the first shifting lever moves from the third shift position to the second shift position.

The operation of shifting unit 12 will now be discussed from the rider's point of view. When the first shifting lever 23 is in its first shift position as seen in FIG. 4, first biasing member 24 urges first shifting lever 23 in a counterclockwise direction. In this first shift position, first stopper 72 engages the bottom surface of positioning plate 91 to hold the first shifting lever 23 in the first shift position against the biasing force of first biasing member 24. Also, in this first shift position, the second shifting lever 25 is held in its set position by stop flange 83 of second shifting lever 25 engaging stop flange 54 of bracket 30 as seen in FIG. 16. In particular, second biasing member 26 normally holds stop flange 83 of second shifting lever 25 against stop flange 54 of bracket 30. In this first shift position, the positioning plate 91 has second stop end 106 engaging the side surface of first lever portion 60 that is adjacent to first stopper 72, as seen in FIG. 16.

Figure 13:
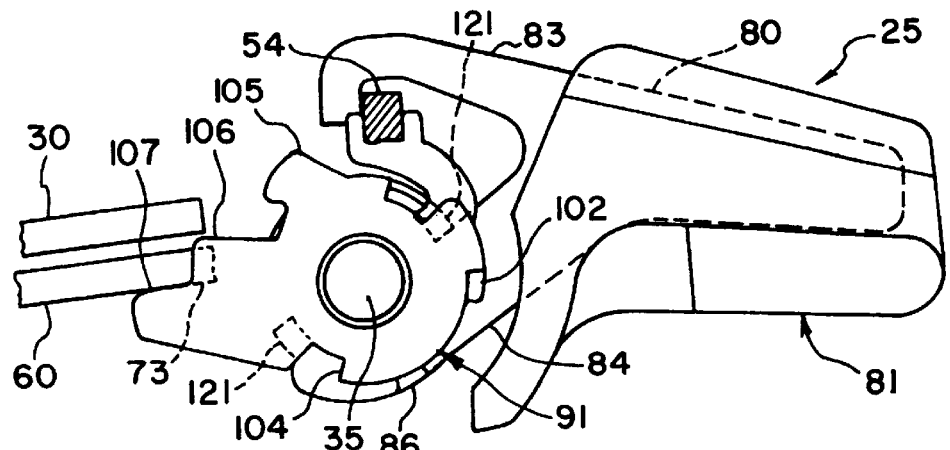
FIG. 13 is a partial top plan view of selected parts of the shifting unit illustrated in FIGS. 2–12, with the first shifting lever in its second shift position and the second shifting lever in its set position.
Figure 14:
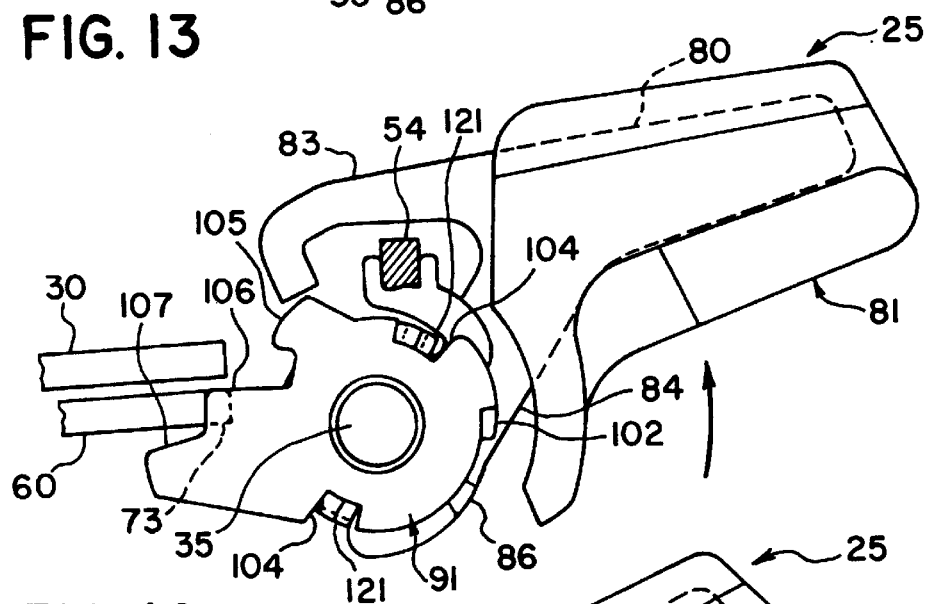
FIG. 14 is a partial top plan view of selected parts of the shifting unit illustrated in FIGS. 2–13, with the first shifting lever in its second shift position and the second shifting lever depressed between its set position and its release position so that the abutments of the pawl plate contacts the abutments (notches) of the positioning plate.
Figure 15:
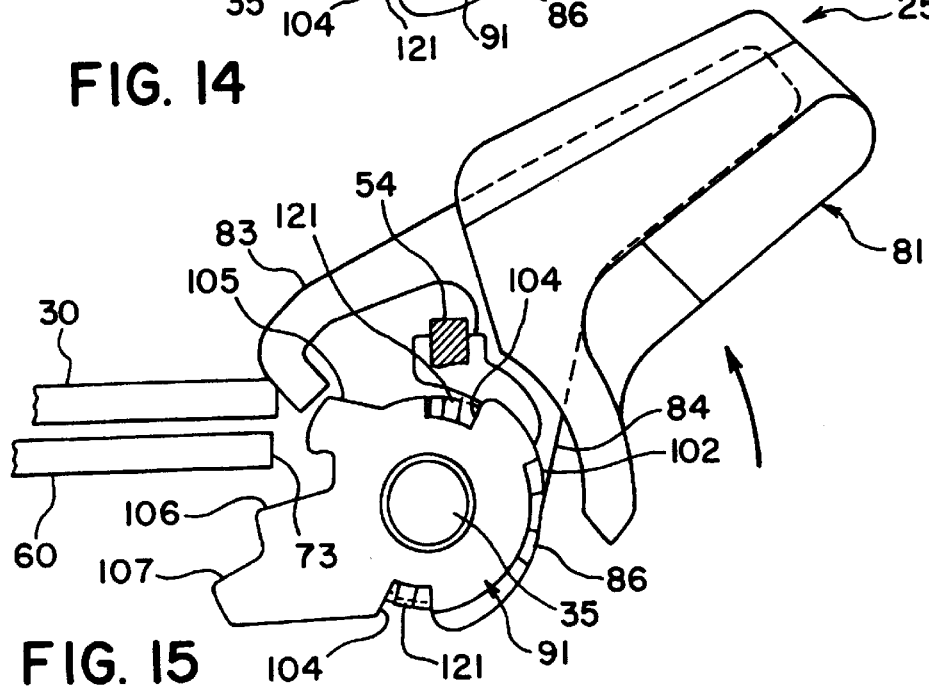
FIG. 15 is a partial top plan view of selected parts of the shifting unit illustrated in FIGS. 2–14, with the first shifting lever moved to its first shift position and the second shifting lever moved to its release position.

To shift from the first shift position to the second shift position, the first shifting lever 23 is moved downwardly against the force of first biasing member 24 to the second position as seen in FIG. 5. This downward movement of first shifting lever 23 causes locking section 68 of first lever portion 60 to move out of engagement with second stop 106 of positioning plate 91. Positioning plate 91 can now rotate in a clockwise direction due to the biasing force of third biasing member 92. This movement of positioning plate 91 causes the third stop end 107 to engage the side surface of first lever portion 60 adjacent the second stopper 73, as seen in FIG. 13. Thus, further movement of positioning plate 91 is prevented by first shifting lever 23, as seen in FIG. 13. If the downward force on first shifting lever 23 is released at this point, the first biasing member 24 will urge the first shifting lever 23 in a counterclockwise direction so that the second stopper 73 engages the bottom surface of positioning plate 91. Thus, positioning plate 91 holds the first shifting lever 23 in its second shift position during this movement of first shifting lever 23 from its first shift position to its second shift position. Also, during this movement of first shifting lever 23, the second shifting lever 25 remains stationary.

Figure 10:
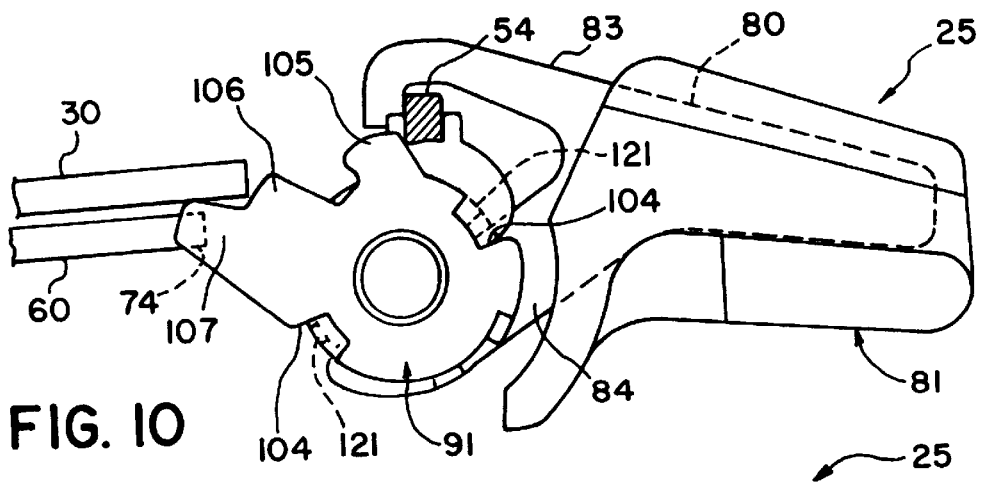
FIG. 10 is a partial top plan view of selected parts of the shifting unit illustrated in FIGS. 2–9, with the first shifting lever in its third shift position and the second shifting lever in its set position.
Figure 11:
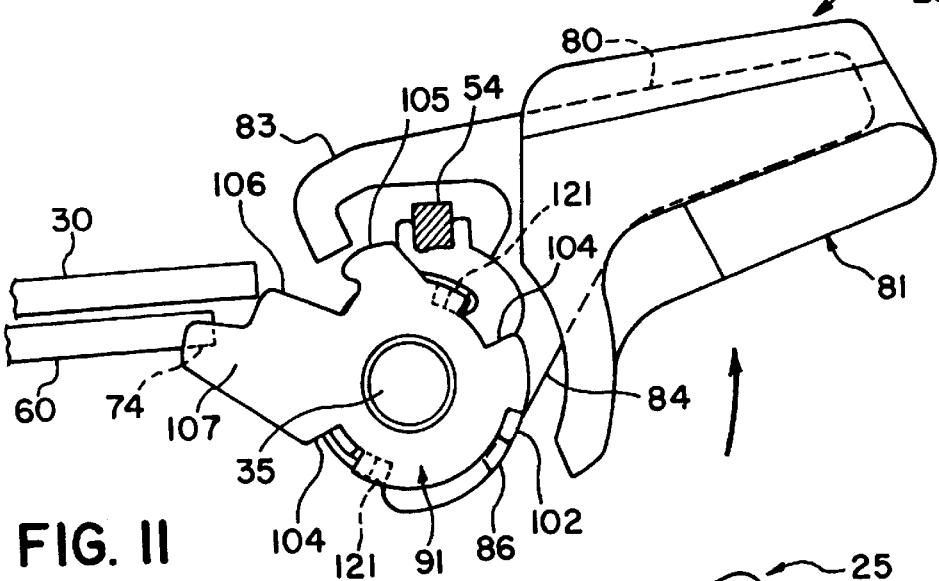
FIG. 11 is a partial top plan view of selected parts of the shifting unit illustrated in FIGS. 2–10, with the first shifting lever in its third shift position and the second shifting lever depressed between its set position and its release position so that an abutment of the second shifting lever contacts an abutment of the positioning plate.
Figure 12:
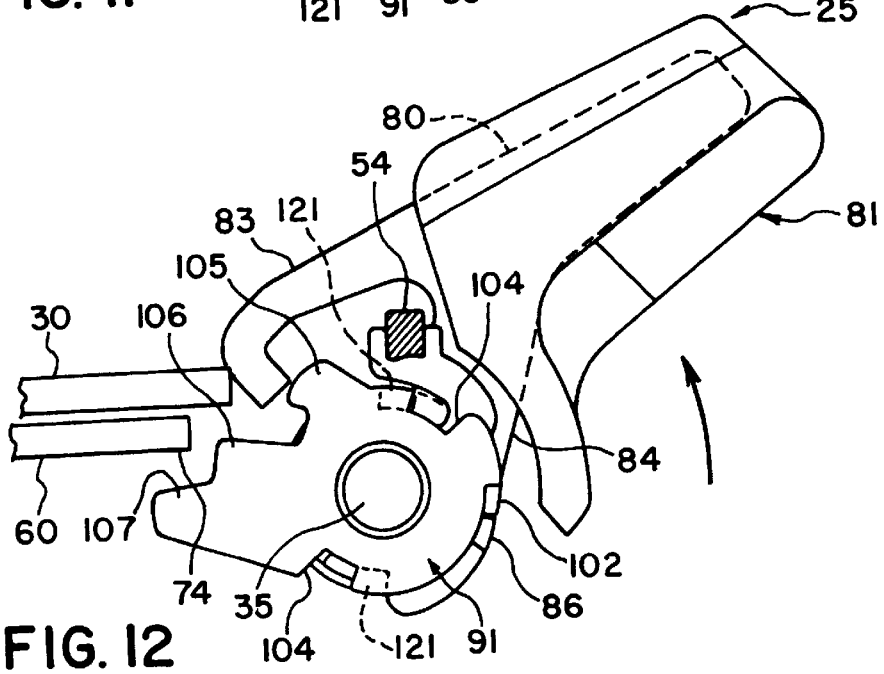
FIG. 12 is a partial top plan view of selected parts of the shifting unit illustrated in FIGS. 2–11, with the first shifting lever moved to its second shift position and the second shifting lever moved to its release position.

Now to shift from the second shift position (FIG. 5) to the third shift position (FIG. 6), a downward force is further applied to first shifting lever 23 causing first shifting lever 23 to move in a clockwise direction about first axle 34 against the force of first biasing member 24. As seen in FIG. 6, this pivotal movement of first shifting lever 23 causes the third stop end 107 to ride along the side surface of first lever portion 60 until third stop end engages the third recess formed by third stopper 74, which allows the positioning plate 91 to rotate under the force of third biasing member 92. Rotation of positioning plate 91 is limited since positioning plate 91 abuts against bracket 30 as seen in FIG. 10. More specifically, positioning plate 91 now has the third stop end 107 engaging first lever mounting portion 41 of bracket 30, and first stop end 105 engaging stop flange 54 of second lever portion 42. In this third position, first shifting lever 23 is prevented from rotating back to the second shift position since third stopper 74 engages the bottom surface of positioning plate 91. During this pivotal movement of first shifting lever 23 from its second shift position to its third shift position, the second shifting lever 25 remains stationary.

It will be apparent to those skilled in the art from this disclosure that the release mechanism 27 allows the rider to move first shifting lever 23 to several shift positions in a single motion if needed and/or desired. Of course, the rider can shift only a single position as explained above, if desired.

Referring to FIGS. 10–13, when the first shifting lever 23 is in its third shift position or its second shift position, the second shifting lever 25 can be utilized to release first shifting lever 23 one shift stage at a time. Specifically, when the first shifting lever 23 is in its third shift position, the second shifting lever 25 is pivoted about the axis of axle 35 from its set position (FIG. 10) to its release position (FIG. 12) so that first shifting lever 23 can move one shift stage from its third shift position to its second shift position under the force of first biasing member 24. More specifically, as seen in FIGS. 10–12 and 18, when second shifting lever 25 is moved from its set position to its release position, the abutment 86 of second lever portion 80 engages abutment 102 of positioning plate 91 so as to pivot positioning plate 91 against the biasing force of the third biasing member 92. This pivotal movement of positioning plate 91 moves the third stop end 107 out of engagement with the recess of the third stopper 74 of first lever portion 60. First shifting lever 23 can now move in a counter-clockwise direction under the force of first biasing member 24. However, the pivotal movement of first shifting lever 23 is limited, since the positioning plate 91 is moved to engage the second recess formed by the second stopper 73 of the first lever portion 60 to prevent further pivotal movement as seen in FIG. 5. When the pushing force on second shifting lever 25 is removed, the second shifting lever 25 will be biased back from its release position to its set position by the second biasing member 26. However, the positioning plate 91 does not move since it is biased in the opposite direction by third biasing member 92 such that third stop end 107 of positioning plate 91 contacts the side of first lever portion 60.

Figures 19, 20:
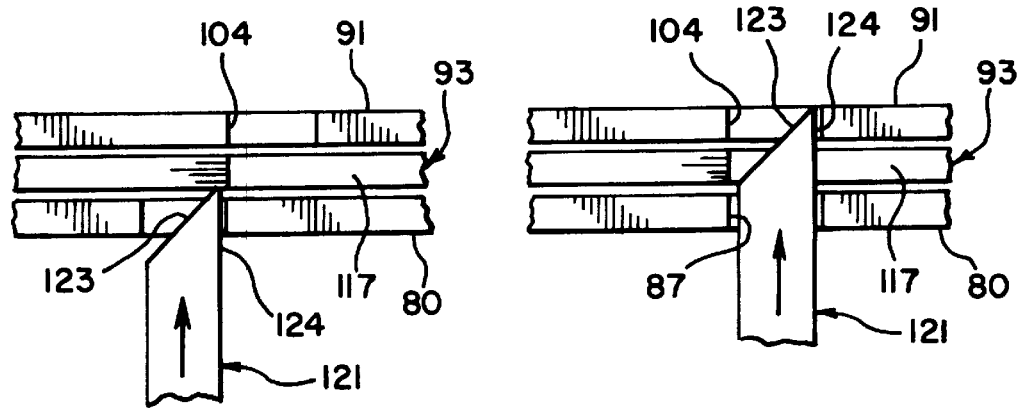
FIG. 19 is a partial side diagrammatic view of selected parts of the release mechanism and the second shifting lever with the shifting unit in the second shift position.
FIG. 20 is a partial side diagrammatic view of selected parts of the release mechanism and the second shifting lever with the shifting unit being moved from the second shift position to the first shift position.

Now referring to FIG. 13–16, the first shifting lever 23 can be shifted from its second shift position to its first shift position by second shifting lever 25. Of course, first shifting lever 23 can also be shifted back to the third shift position as explained above. When the first shifting lever 23 is in its second shift position and the second shifting lever 25 is pushed from its set position (FIG. 13) to its release position (FIG. 15), the first shifting lever 23 moves from its second shift position to its first shift position under the biasing force of first biasing member 24. More specifically, movement of second shifting lever 25 from its set position to its release position causes abutment arms 121 of pawl plate 94 to be aligned with notches 104 of positioning plate 91 after partial pivotal movement of second shifting lever 25 as seen in FIGS. 19 and 20. In this position, the abutment surfaces 124 of abutment arms 121 engage the abutment surfaces formed by the notches 104 so that positioning plate 91 rotates together with further pivotal movement of second shifting lever 25. Accordingly, positioning plate 91 is now rotated so that the second stop end 106 of positioning plate 91 moves out of engagement with the second recess formed by second stopper 73. Thus, first shifting lever 23 pivots about first axle 35 by first biasing spring 24.

The pivotal movement of first shifting lever 23 is limited since first stopper 72 now engages the bottom of positioning plate 91 to prevent any additional movement. Moreover, positioning plate 91 is prevented from pivoting back under the bias of the third biasing spring 92 since positioning plate 91 engages the side surface of first lever portion 60 adjacent the first recess formed by the first stopper 72 as seen in FIG. 16.

When the second shifting lever 25 moves from its release position back to its set position under the force of second biasing member 26, the pawl plate 94 is retracted downwardly along the axis of axle 35 against the force of fourth biasing member 95. Specifically, the ratcheting surfaces 123 engage the pawl control plate 93 such that pawl plate 94 is forced downwardly against the force of biasing member 95. More specifically, the biasing force of the second biasing member 26 is larger than the biasing force of fourth biasing member 95 such that the biasing force of second biasing member 26 forces the pawl plate 94 downwardly against the force of the fourth biasing member 95.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A shifting unit for a bicycle comprising:
   a mounting member adapted to be coupled to the bicycle:
   a first shifting lever pivotally coupled to said mounting member between at least a first shift position a second shift position and a third shift position said second shift position being located between said first and third shift positions;
   a first biasing member coupled to said first shifting lever to apply a first biasing force that urges said first shifting lever from said second and third shift positions towards said first shift position;
   a second shifting lever pivotally coupled to said mounting member between a set position and a release position;
   a second biasing member coupled to said second shifting lever to apply a second biasing force that urges said second shifting lever from said release position to said set position; and
   a release mechanism operatively coupled between said first and second shifting levers said release mechanism including a positioning plate pivotally coupled to said mounting member and having a locking portion formed thereon that selectively engages said first shifting lever to hold said first shifting lever in one of said first second and third shift positions against said first biasing force of said first biasing member and a third biasing member coupled to said positioning plate to apply a third biasing force that urges said positioning plate against said first shifting lever, a portion of said release mechanism being moved to selectively release said locking portion from said first shifting lever upon rotation of said second shifting lever from said set position to said release position such that said first shifting lever moves only one position, said positioning plate including a first abutment member that selectively engages a second abutment member formed on said second shifting lever, said second abutment member being positioned to engage said first abutment member upon rotation of said second shifting lever from said set position to said release position when said first shifting lever is in said third shift position such that said positioning plate rotates against said third biasing force of said third biasing member to release said first shifting lever from said third shift position to said second shift position.

2. A shifting unit according to claim 1, wherein said positioning plate is constructed of a pressed metal plate.

3. A shifting unit according to claim 1, wherein said release mechanism further includes a pawl member coupled to said second shifting lever to pivot with said second shifting lever and move axially relative to said second shifting lever, and said pawl member includes a third abutment member that selectively engages a fourth abutment member formed on said positioning plate, said fourth abutment member being positioned to engage said third abutment member upon rotation of said second shifting fever from said set position to said release position when said first shifting lever is in said second shift position such that said positioning plate rotates against said third biasing force of said third biasing member to release said first shifting lever from said second shift position to said first shift position.

4. A shifting unit according to claim 3, wherein said pawl member is constructed of a pressed metal plate.

5. A shifting unit according to claim 3, wherein said first shifting lever pivots about a first axle and said second shifting lever pivots about a second axle that is nonconcentric with said first axle.

6. A shifting unit according to claim 5, wherein said second shifting lever, said positioning plate and said pawl member are mounted on said second axle to pivot about its axis.

7. A shifting unit according to claim 3, wherein said release mechanism further includes a pawl control member nonrotatably coupled to said second axle between said positioning plate and said pawl member to limit axial movement of said third abutment member of said pawl member, and said pawl control member has an opening to selectively allow said third abutment to pass therethrough and engage said fourth abutment member of said positioning plate.

8. A shifting unit for a bicycle, comprising:

a mounting member adapted to be coupled to the bicycle;

a first shifting lever pivotally coupled to said mounting member between at least a first shift position, a second shift position and a third shift position, said second shift position being located between said first and third shift positions;

a first biasing member coupled to said first shifting lever to apply a first biasing force that urges said first shifting lever from said second and third shift positions towards said first shift position;

a second shifting lever pivotally coupled to said mounting member between a set position and a release position;

a second biasing member coupled to said second shifting lever to apply a second biasing force that urges said second shifting lever from said release position to said set position;

a positioning plate pivotally coupled to said mounting member to hold said first shifting lever in one of said first, second and third shift positions, said positioning plate including a first abutment member and a second abutment member; and a third biasing member coupled to said positioning plate to apply a third biasing force that urges said positioning plate against said first shifting lever;

said second shifting lever including a third abutment member and a fourth abutment member, with said third abutment member being positioned to engage said first abutment member upon rotation of said second shifting lever from said set position to said release position when said first shifting lever is in said third shift position such that said positioning plate rotates against said third biasing force of said third biasing member to release said first shifting lever from said third shift position to said second shift position, and said fourth abutment member being positioned to engage said second abutment member upon rotation of said second shifting lever from said set position to said release position when said first shifting lever is in said second shift position such that said positioning plate rotates against said third biasing force of said third biasing member to release said first shifting lever from said second shift position to said first shift position.

9. A shifting unit according to claim 8, wherein said positioning plate is constructed of a pressed metal plate.

10. A shifting unit according to claim 9 wherein said first abutment member includes a tab extending outwardly from said positioning plate.

11. A shifting unit according to claim 10, wherein said second abutment member is formed by a notch in said positioning plate.

12. A shifting unit according to claim 8, wherein said second shifting lever includes a lever portion and a pawl portion with said fourth abutment member formed on said pawl portion, said pawl portion being coupled to said lever portion to rotate therewith and axially movable relative to said lever portion to selectively move said positioning plate.

13. A shifting unit according to claim 12, wherein said pawl portion is constructed of a pressed metal plate.

14. A shifting unit according to claim 12, wherein said third abutment member of said second shifting lever includes a tab extending outwardly from said second shifting lever.

15. A shifting unit according to claim 12, further comprising a fourth biasing member applying a fourth biasing force that urges said pawl portion towards said lever portion and said positioning plate.

16. A shifting unit according to claim 12, wherein said first shifting lever pivots about a first axle and said second shifting lever pivots about a second axle that is nonconcentric with said first axle.

17. A shifting unit according to claim 15, wherein said pawl portion of said second shifting lever, said lever portion of said second shifting lever and said positioning plate are mounted on said second axle to pivot about its axis.

18. A shifting unit according to claim 17, wherein said release mechanism further includes a pawl control member nonrotatably coupled to said second axle between said positioning plate and said pawl portion to limit axial movement of said fourth abutment member of said pawl portion, said pawl control member has an opening to selectively allow said fourth abutment to pass therethrough and engage said second abutment member of said positioning plate.

* * * * *